United States Patent
Akhmetzyanov et al.

[11] Patent Number: 5,551,324
[45] Date of Patent: Sep. 3, 1996

[54] METHOD AND DEVICE FOR COOLING THE MACHINE ZONE USING AN IONIZED GASEOUS CUTTING FLUID

[76] Inventors: Izyaslav D. Akhmetzyanov, Moskovsky prospekt, 52,kv.57, Russian Federation; Atik Zamman, Kutuzovsky prospekt, 2/1, kv. 686, Moscow, Russian Federation

[21] Appl. No.: 244,307
[22] PCT Filed: May 17, 1993
[86] PCT No.: PCT/RU93/00110
§ 371 Date: May 25, 1994
§ 102(e) Date: May 25, 1994
[87] PCT Pub. No.: WO94/07631
PCT Pub. Date: Apr. 14, 1994

[30] Foreign Application Priority Data

Oct. 7, 1992 [RU] Russian Federation ............... 5060170

[51] Int. Cl.⁶ ............... B23Q 11/10; B23B 1/00
[52] U.S. Cl. ............... 82/1.11; 82/900; 409/136
[58] Field of Search ............... 82/50, 900, 1.11; 408/8, 56, 58; 409/135, 136

[56] References Cited

FOREIGN PATENT DOCUMENTS

| | | | |
|---|---|---|---|
| 1483205 | 5/1989 | U.S.S.R. | ............... F25B 9/02 |
| 835711 | 6/1991 | U.S.S.R. | ............... 82/900 |
| 1368077 | 9/1974 | United Kingdom. | |
| 1444704 | 8/1976 | United Kingdom | ............ B23Q 11/10 |
| WO91/04811 | 4/1991 | WIPO | ............... B23B 1/00 |

OTHER PUBLICATIONS

Berg, A. I., et al., "Solution Errors–Remote Measuring Frequency System", *Encyclopedia of Modern Engineering –Automation of Manufacturing Processes and Industrial Electronics*, p. 402.

Primary Examiner—M. Rachuba
Assistant Examiner—Kenneth J. Hansen
Attorney, Agent, or Firm—Keck, Mahin & Cate

[57] ABSTRACT

The method and device are used for cooling the machining zone of a machine tool. According to a method for cooling the machining zone a gaseous cutting to a method for cooling the machining zone a gaseous cutting fluid that has previously been treated with in the field of a corona discharge initiated in an ionizer is fed to the machining zone at a rate not below the cutting speed, a controlled stabilized electric current being used for initiating a corona discharge, the intensity of the electric current is changed in accordance with a change in the rate of flow of the gaseous cutting fluid. A device for carrying the method into effect comprises an ionizer (1) having a housing (7) provided with an outlet nozzle (8) and communicating, through a piping (9), with a source (3) of the gaseous cutting fluid, a corona-discharge electrode (2) accommodated in the housing (1), and a power source (4) electrically connected to the corona-discharge electrode (2) is also provided with a regulator (5) connected in the gaseous cutting fluid feed piping (9) and with a controlled stabilizer (6) of the output electric current intensity connected to the supply circuit of the corona-discharge electrode (2).

5 Claims, 1 Drawing Sheet

5,551,324

METHOD AND DEVICE FOR COOLING THE MACHINE ZONE USING AN IONIZED GASEOUS CUTTING FLUID

TECHNICAL FIELD

The invention relates in general to materials machining methods and more specifically to a method and device for cooling the machining zone.

BACKGROUND ART

Known in the present of the art is a method for machining materials (U.S. Pat. No. 1,483,205), wherein compressed air is supplied through a vortex tube to an air stream ionizing means, a corona discharge being applied for the purpose. Once electric current has been applied to the corona-discharge electrode, a corona discharge occurs and the electric field of said discharge ionizes and ozonizes the surrounding air, whereupon the ionized and ozonized air stream is fed, through an inlet nozzle, to the machining zone so as to cool the cutting tool and the material being machined. In addition, the ionized air stream promotes formation of a fine oxide film on the surface of the material being machined and of the cutting tool. Such an oxide film serves as lubricant in the machining process which reduces friction and hence decreases heat evolution in the machining zone.

However, the method discussed before fails to provide adequately efficacious cooling and lubrication of the surface of the material being machined and of cutting tool. Considerable convective and gas-dynamic streams which prevent the ionized and ozonized air stream from getting to the machining zone. Thus, formation of an oxide film on the surface being machined and on that of the cutting tool is less reliable, which results in low cutting tool endurance and affected quality of surface finish.

The method described above can be carried into effect through the use of a device for machining materials (U.S. Pat. No. 1,483,205), comprising a negative-polarity current source, a unit for establishing an air stream, and an air stream ionizing means having a corona-discharge electrode electrode connected to the current source. The air ionizing means appears as a stub pipe accommodating the corona-discharge electrode arranged lengthwise the stub pipe. The air stream establishing unit comprises a compressed air source which communicates, via a vortex tube, with the entrance to the air-stream ionizing means.

The device discussed above suffers from the same disadvantages as the method described before.

DISCLOSURE OF THE INVENTION

The present invention has for its principal object to provide a method for cooling the machining zone which is capable of feeding to the machining zone at an adequate flow rate a gaseous cutting fluid having controlled physical and chemical parameters that enable an oxide film having a sufficient and uniform thickness to be obtained on the interacting surfaces of the material being machined and of the cutting tool, as well as an efficient heat withdrawal from the machining zone, and also to provide a device for carrying said method into effect.

The foregoing object is accomplished due to the fact that it is a method for cooling the machining zone, wherein a gaseous cutting fluid is fed to the machining zone that has been treated in the field of a corona discharge in an ionizer, according to the invention, the gaseous cutting fluid is fed to the machining zone at a flow rate not below the cutting speed and use is made, for initiating a corona discharge, of a controlled electric current whose intensity is varied in accordance with a change in the rate of flow of the gaseous cutting fluid.

Convective and dynamic gas streams result from the material machining process in the machining zone, which prevent a flow of the gaseous cutting fluid to get into the machining zone. To avoid such a negative phenomenon the rate of flow of the gaseous cutting fluid must be not less than the cutting speed. Use of stabilized (controlled) electric current for initiating a corona discharge make it possible to attain a stable degree of ionization of the gaseous fluid during the machining process. This results in formation of a uniform oxide film on the surface of the cutting tool and of the surface being machined, said film serving as a lubricant in the machining process. As a result, tool endurance is enhanced, as well as production output and quality of surface finish. Moreover, varying the electric current intensity makes it possible to maintain a required rate of ionization of the gaseous cutting fluid in the course of machining in case of a change in the rate of the fluid flow, which adds also to the quality of surface finish and reproducibility of good machining results for the various materials and machining conditions.

It is expedient that the electric current intensity be changed proportionally to a change in the rate of flow of the cutting fluid. This makes it possible to maintain a required degree of ionization of the fluid and its chemical activity which provides for reproducibility of high quality of surface finish and enhances the cutting tool endurance.

For some of the materials being machined, such as, e.g., automatic steels, it is necessary to change the electric current intensity in a direct ratio with a change in the rate of flow of the gaseous cutting fluid.

It is expedient to make use of a stabilized electric current for initiation of a corona discharge. This allows of a best agreement between the change in the intensity of controlled electric current and the rate of flow of the gaseous cutting fluid.

A device for cooling the machining zone carrying the proposed method into effect, comprises an ionizer having a housing with an outlet nozzle directed towards the machining zone, said housing communicating, through a piping, with a source of the gaseous cutting fluid, a corona-discharge electrode accommodated in said housing, and a power supply source electrically connected to the corona-discharge electrode, according to the invention, the gaseous cutting fluid feed piping has a flow regulator of said fluid.

The device possesses all the advantages inherent in the proposed method.

DETAILED DESCRIPTION OF THE PREFERRED EMBODIMENTS

Figure 1:
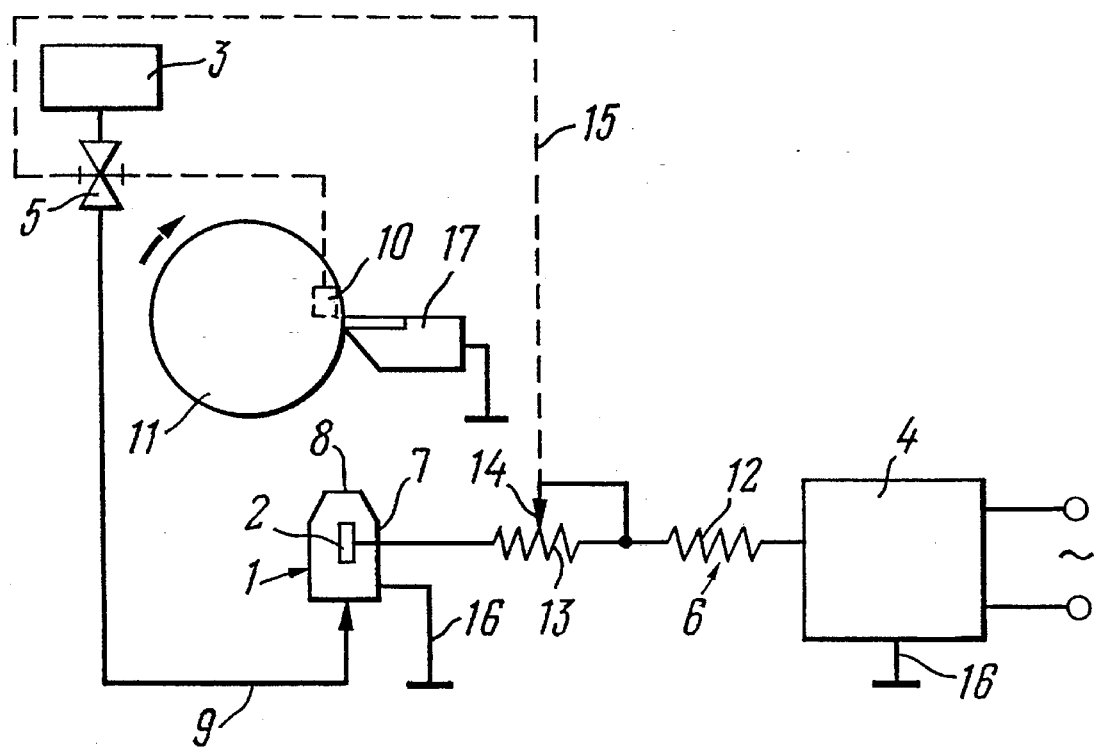
FIG. 1 shows a device for cooling the machining zone according to the preferred embodiment of the present invention.

In what follows the present invention is illustrated by a detailed description of a specific exemplary embodiment thereof with reference to the accompanying drawing, which shows schematically a device for cooling the machining zone, operating in compliance with the proposed method, according to the invention.

BEST METHODS OF CARRYING OUT THE INVENTION

The device for cooling the machining zone comprises an ionizer 1 of any construction provided with a corona-discharge electrode 2, e.g., a negative one, a source 3 of the gaseous cutting fluid, a power supply source 4 connected to the corona-discharge electrode 2, a gaseous cutting fluid flow regulator 5, and a controlled stabilizer 6 of the output current intensity in the supply circuit.

The ionizer 1 comprise a hollow housing 7 which serves, e.g., as a positive electrode and has an outlet nozzle 8 directed towards the machining zone. The housing 7 accommodates the corona-discharge electrode 2 arranged along the longitudinal axis thereof and connected to the power supply source 4 in the capacity of which use can be made of an alternating current source, or a negative-polarity current source, or else a positive-polarity current source, selection of said current sources depending on the workpiece material, the cutting tool, cutting feeds and speeds, and a composition of the gaseous cutting fluid.

The housing 7 communicates, through a piping 9, with the source 3 of the gaseous cutting fluid, e.g., compressed air which, while passing through the housing 7 and interacting with the field of the corona discharge set up between the corona-discharge electrode 2 and the housing 7, gets ionized and ozone is formed simultaneously, whereupon compressed air is fed, via the outlet nozzle 8, to the machining zone.

The gaseous cutting fluid flow regulator 5 is cut in the piping 9 and is in fact a known device capable of maintaining the rate of flow of said fluid within preset limits not below the cutting speed, e.g., a valve whose closing device or actuator can be controlled manually against the readings of an instrument measuring the cutting speed, or automatically in response to signals produced by an in-cycle measuring sensor 10 positioned on a workpiece 11 being machined and indicated with a dotted line, the connection line of the sensor 10 to closing device of the regulator 5 being also shown with a dotted line.

The controlled stabilizer 6 of the output electric current intensity is connected in the supply circuit of the corona-discharge electrode 2 between the power supply source 4 and the ionizer 1 and is in fact a known electric current stabilizer, e.g., an electronic amplifier with a negative current feedback or, as shown in the Drawing, in the form of two series-connected resistors, a fixed 12 and a variable 13, a total resistance value of both being in excess of that of the corona discharge, said resistors performing regulation of the electric current intensity in accordance with a change in the rate of flow of the gaseous cutting fluid. Control of an actuator 14 of the variable resistor 13 can be effected manually in keeping with a change in the position of the closing device of the regulator 5, or automatically when the input of the actuator 14 of the variable resistor 13 is connected, through a communication line 15 indicated with a dotted line, to the output of the closing device of the regulator 5.

The power supply source 4 and ionizer 1 are connected to zero-potential buses 16.

The device described above with reference to the method proposed herein operates as follows.

The workpiece 11 to be machined is set in rotation at a preset speed V, a cutting tool 17 is approached to the workpiece surface till getting in contact therewith, whereupon the machining process begins with the relative movement of the tool and workpiece. The cutting speed is preset in accordance with the preselected machining conditions and is changed depending on the workpiece material, the cutting tool used, the type of equipment applied, and so on.

Simultaneously with the machining process a gaseous cutting fluid is fed to the machining zone, said fluid being in effect an ionized and ozonized air stream which is established by a known technique in the field of a corona discharge of the ionizer and is fed as a directed flow through the nozzle 8 of the housing 7. The stream of ionized air cools down the cutting tool 17 and the material of the workpiece 11 being machined and, moreover, the ionized air stream promotes the formation of a fine oxide film on the surface of the workpiece material being machined and on that of the cutting tool, said oxide film serving as a lubricant and reduces heat evolution rate in the machining zone.

A rate of flow $V_1$ of the gaseous cutting fluid is set in keeping with a preset or changed cutting speed, using the regulator 5, said rate being equal to or in excess of the cutting speed, whereby the stream of the cutting fluid is enabled to overcome the convective and gas-dynamic air streams developed in the machining zone.

In order to maintain the parameters of the ionized air stream at a preset level in accordance with a preset or changed cutting speed use is made of a stabilized electric current for initiating a corona discharge in the ionizer, the magnitude of said current being set starting from 1 A in accordance with a change in the rate of flow $V_1$ of the gaseous cutting fluid. To this aim a control signal is delivered from the output of the regulator 5 and applied to the input of the controlled stabilizer 6, i.e., of the variable resistor 13 which changes the electric current intensity proportionally or in a direct ratio with a change in the rate of flow of the gaseous cutting fluid, which depends on the type of machining and on that of the workpiece material and of the cutting tool.

The fact that the adjustment of the stabilized current intensity starts from 1 A is accounted for by that with the current intensity below 1 A a corona discharge in the ionizer fails to be initiated.

EXAMPLE 1

The workpiece made of steel grade 20 was machined in a lathe, using a MC-1460 cutting tool, at a cutting speed of 160 m/min and a rate of flow of the gaseous cutting fluid equal to 600 m/min. In order to initiate a corona discharge use was made of an electric current intensity of 60 A. With the cutting speed increased up to 250 m/min the rate of flow of the gaseous cutting fluid was 900 m/min and the electric current intensity controlled by the stabilizer was changed proportionally to be 80 A.

As a result, the tool endurance, according to the proposed method, was 61 and 31 min, respectively compared with 34 and 19 min, respectively, according to the prototype.

EXAMPLE 2

The workpiece made of steel grade 45 was machined in a milling machine, using milling cutters made of the P6M5 alloy. The cutting speed was 15 m/min and the rate of flow of the gaseous cutting fluid was 120 m/min. An electric current intensity of 50 A was applied to initiate a corona discharge. With the cutting speed increased up to 25 m/min the rate of flow of the gaseous cutting fluid was 200 m/min, while the intensity of electric current controlled by the stabilizer was changed proportionally to be 83 A.

The endurance of the milling cutters increased 1.45 times in both cases compared with the prototype.

Industrial Applicability

The herein-proposed method can find application in machining various materials, that is, in turning, milling, gear bobbing, and so on. The device for cooling the machining zone is applicable in the known machine tools, including NC ones, as well as in automated and rotary transfer lines and in robotic workcells.

We claim:

1. A method for cooling a machining zone, wherein a gaseous cutting fluid is fed to the machining zone, said cutting fluid having been treated in an ionizer in a field of a corona discharge, CHARACTERIZED in that the gaseous cutting fluid is fed to the machining zone at a flow rate not below the cutting speed and a controlled electric current is used for initiating the corona discharge, an intensity of the electric current being varied in accordance with a change in the flow rate of the gaseous cutting fluid.

2. A method according to claim 1, CHARACTERIZED in that a controlled stabilized electric current is used for initiating a corona discharge.

3. A method according to claim 1, CHARACTERIZED in that the electric current intensity is changed in proportion to a change in the flow rate of the gaseous cutting fluid.

4. A method according to claim 1, CHARACTERIZED in that the electric current intensity is changed in direct proportion to a change in the flow rate of the gaseous cutting fluid.

5. A device for cooling a machining zone, comprising:

an ionizer having a housing provided with an outlet nozzle directed towards a machining zone, said housing communicating, through a piping, with a source of a gaseous cutting fluid, said device being adapted to feed said gaseous cutting fluid to said machining zone at a flow rate not below a cutting speed;

a corona-discharge electrode accommodated in the housing;

a power supply source electrically connected to the corona-discharge electrode, intensity of electric current provided to the corona-discharge electrode being varied in accordance with a change in the flow rate of the gaseous cutting fluid; and a regulator for regulating the flow rate of the gaseous cutting fluid in the piping through which said cutting fluid is fed.

* * * * *